Dec. 6, 1966   L. E. EATON   3,290,093

DUMP TRUCK

Filed Oct. 13, 1964   2 Sheets-Sheet 1

INVENTOR.
LYLE E. EATON
BY RONALD C. KAMP
ATTORNEY

Dec. 6, 1966 L. E. EATON 3,290,093
DUMP TRUCK
Filed Oct. 13, 1964 2 Sheets-Sheet 2

INVENTOR.
LYLE E. EATON
BY RONALD C. KAMP
ATTORNEY

United States Patent Office 3,290,093
Patented Dec. 6, 1966

3,290,093
DUMP TRUCK
Lyle E. Eaton, Pekin, Ill., assignor to LeTourneau-Westinghouse Company, Peoria, Ill., a corporation of Illinois
Filed Oct. 13, 1964, Ser. No. 403,569
10 Claims. (Cl. 298—17)

The present invention relates generally to dump trucks, and more particularly, to lump trucks having means for heating the dump body.

In the design of dump trucks, especially those of the off-highway type, it is highly desirable to provide some means for heating the dump body in order to prevent the material carried therein from adhering to the body in cold weather. It has been proposed in the past that the exhaust gases from the truck engine be utilized in heating the body. However, a problem is encountered in effecting such a method of body heating because the body itself must move relative to the engine during the dumping operation. One solution to this problem, as disclosed in U.S. Patent No. 3,039,493, is to provide valve means operated by movement of the dump body to direct the hot gases through the body in its lowered position or to direct the gases through an auxiliary exhaust line whenever the body is oriented in any position other than its lowered position. Such a solution has disadvantages in that the heating is not continuous, but is interrupted whenever the body is raised, and because the auxiliary exhaust line often terminates in close proximity to the cab of the truck. The soot, which is considerable especially when diesel engines are used, discharged from this exhaust line becomes deposited on the cab giving it an unsightly appearance, and additionally, causes plugging or restriction of the engine air cleaners.

It is, therefore, an object of this invention to provide a means for heating a dump body by utilizing the engine exhaust gases, which is continuous and which substantially reduces the possibility of fouling the engine air cleaners.

It is another object of the present invention to provide a means for continuously heating a dump body wherein the heat loss to the atmosphere is minimized, and which will withstand a multitude of dumping cycles without failure.

Figure 1:
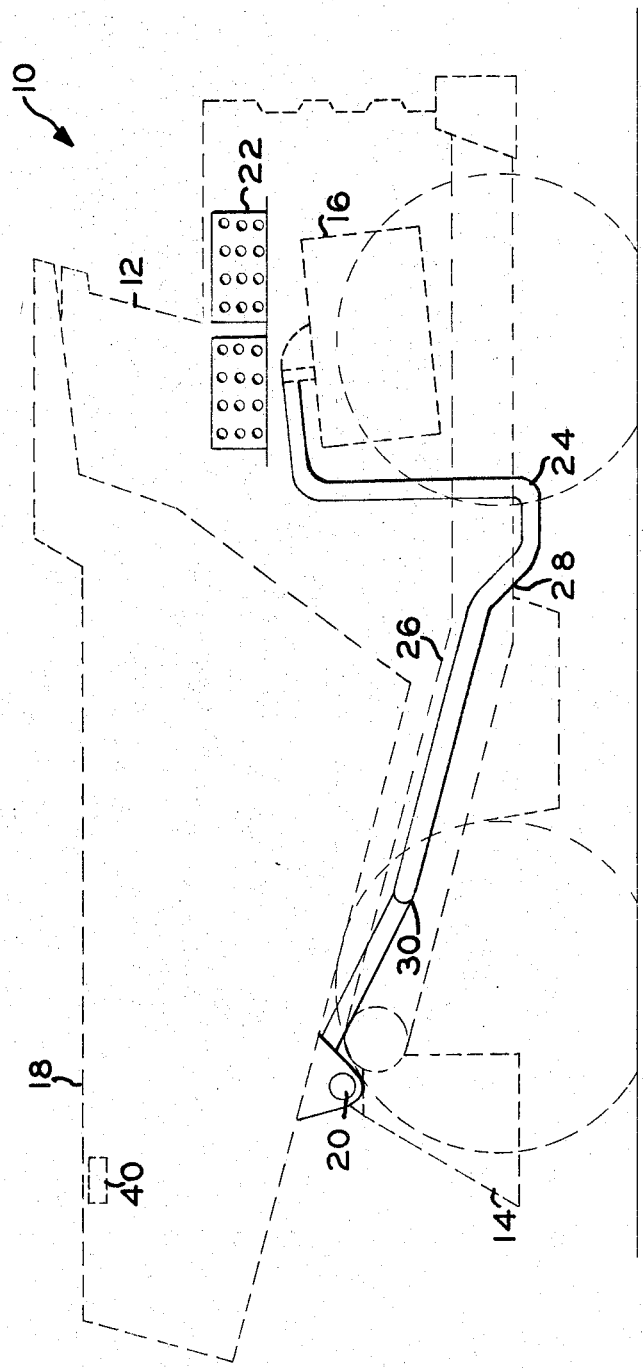
Figure 2:
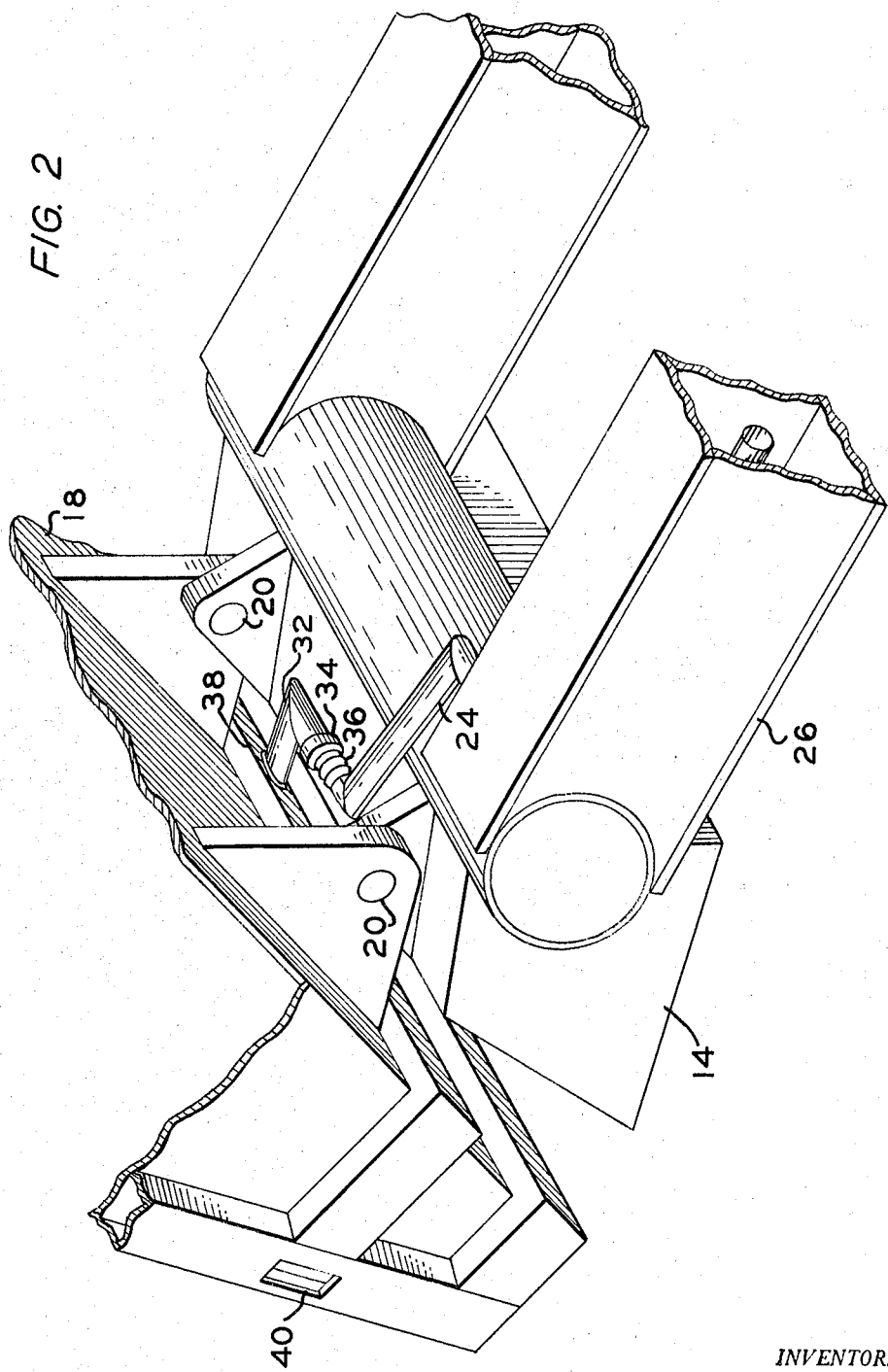

These and other objects and many of the attendant advantages will become more readily apparent from a perusal of the following specifications and the accompanying drawings wherein:

FIG. 1 is side elevational view showing the present invention incorporated into a truck, shown in phantom lines, and FIG. 2 is an isometric view of a portion of a truck with the dump body elevated and showing the connection of the engine exhaust to the body.

Referring now in detail to the drawings, there is shown in FIG. 1 a dump truck, indicated generally at 10, having a cab 12, a frame 14, and an engine 16. A dump body 18 is pivotally mounted by means of pivot pins 20 to the frame 14. Air cleaners 22 are mounted on or adjacent to the cab 12 and are connected to the intake of the engine 16 to filter the air going into the engine. An exhaust line 24 is connected to the exhaust manifold of the engine 16, in a manner well known in the art. The frame 14 includes a box section member 26 which is positioned to extend substantially longitudinally of the truck 10. The exhaust line 24 enters the box section member 26, at 28, and extends along the interior of the member 26 and exits from the member 26, at 30, rearwardly of the point of entrance 28. This enclosure of the exhaust line 24 within the box section member 26 reduces the heat loss to the atmosphere, in addition to providing some measure of protection for the line 24 from being punctured by rocks and debris thrown up by the truck wheels during travel.

As best shown in FIG. 2, the exhaust line 24 is connected to an elbow or duct 32 affixed to the bottom of the dump body 18 by means of a rotatable and sealing joint 34, the center line of the joint 34 being co-axial and co-linear with the center line of the pins 20 which pivotally mount the body 18 on the frame 14. Because of the alignment of the centerline of the exhaust line 24 adjacent the joint 34 and the centerline of the free end of the elbow 32, with the centerline of the pins 20, raising and lowering of the body results in pure rotation of the free end of the elbow 32 relative to the exhaust line 24. The joint 34, being of a type well known in the art which can rotate while maintaining a seal between its mating parts, provides free fluid communication between the exhaust line and the elbow, and thereby the dump body, regardless of the position thereof. Since the pins 20 will wear and becaue of manufacturing tolerances inherent in production, or if rubber bushings are used to support the pins, a short section of flexible or bellows type piping 36 is interposed between the exhaust line 24 and the joint 34. This piping 36 will compensate for any misalignment which occurs because of deflections caused by side loads imparted to the body 18 or because of wear and manufacturing tolerances. In addition, this type of piping 36, which is installed under slight compression, will exert an axial force which aids the two mating parts of the joint 34 in maintaining sealing engagement.

It is understood that the body 18 comprises at least two sheets or layers of metal separated and supported by a series of baffles which distribute the hot exhaust gases from their point of entry into the body at 38 throughout the space between the two layers and permit the gases to exhaust or exit from the body through the outlets 40.

Operation

It can be seen that whenever the engine 16 is functioning, the hot exhaust gases are forced through the exhaust line 24, the flexible piping 36, the joint 34 and the elbow 32, and into the truck body 18. Because of the alignment of the exhaust line 24 and the elbow 32 affiixed to the body 18 with the pivot axis of the dump body, the exhaust gases will provide uninterrupted heating of the body. In addition, the gases are always exhausted to the atmosphere at a point remote from the air cleaners and the cab. Further, the exhaust line 24 being carried within the box section 26 of the frame 14 over a major portion of its transverse from the engine to the point of entry into the truck body minimizes the loss of heat to the atmosphere and thereby affords efficient heating of the body. The present invention also provides a prolonged life because no flexible tubing, which must undergo severe bending stress during a dump cycle, is utilized. The only flexible tubing present is piping 36 which must flex only to compensate for misalignments.

It is to be understood that various modifications and variations can be made within the scope of the present invention, which is defined by the appended claims.

Having described an embodiment of the invention, what is claimed is:

1. In a dump truck having a frame and a body pivotally mounted thereon for pivoting about a horizontal axis, the body being of the type capable of being heated by gases from the truck engine, the improvement comprising:
   an exhaust conduit associated with said frame and connected to said engine to receive the hot gases expelled therefrom,
   duct means on said body for conducting exhaust gases about said body, and
   rotatable joint means having a horizontal rotational axis, said joint means connecting said exhaust conduit and said duct means, said rotation axis in axial alignment with the horizontal pivot axis of said body to said frame, whereby exhaust gases are permitted to enter said duct means on said body irrespective of the position of said body relative to said frame.

2. In a dump truck according to claim 1 the improvement further comprising flexible piping interposed between said exhaust conduit and said duct means adjacent said joint whereby compensation for misalignments between said pivot axis and said rotation axis is achieved.

3. In a dump truck according to claim 1 the improvement wherein said frame includes a box member extending substantially longitudinally of the truck and encompassing said exhaust conduit through a major portion of its traverse from said engine to said body.

4. In a dump truck having a frame and body, pin means for pivotally mounting said body on said frame and defining thereby a horizontal pivot axis, said body being of the type capable of being heated by exhaust gases from the truck engine, the improvement comprising:

an exhaust conduit fixed on said frame and connected to said engine to receive the hot gases expelled therefrom, said exhaust conduit extending from said engine through and encompassed by at least a portion of said frame to a point rearward of said engine, duct means on said body for conducting exhaust gases about said body, and rotatable joint means having a horizontal rotation axis, said joint means connecting said exhaust conduit and said duct means, said rotation axis in axial alignment with said horizontal pivot axis, whereby said body is continuously and efficiently heated.

5. In a dump truck according to claim 4 the improvement wherein the outlet for said gases is located in the rearward portion of said body.

6. In a dump truck according to claim 5 the improvement further comprising flexible piping interposed between said exhaust conduit and said joint means to compensate for any misalignment between said horizontal pivot axis and said rotation axis.

7. In a dump truck according to claim 1, the improvement further including misalignment compensating means interposed between said exhaust conduit and said duct means adjacent said joint means to compensate for axial misalignment between said horizontal pivot axis and said rotation axis.

8. In a dump truck according to claim 1, the improvement wherein said rotatable joint means includes mating parts adapted to be relatively rotated about said axis while maintaining a fluid seal therebetween.

9. In a dump truck according to claim 8, the improvement further including flexible piping means interposed between said rotatable joint means and elbow means connected to at least one of said exhaust conduit and said duct means.

10. In a dump truck according to claim 4 wherein said pin means includes at least a pair of transversely disposed pins in axial alignment pivotally connecting said frame and said body, said rotatable joint positioned between said pins with said rotation axis in axial alignment with said pins, and flexible piping interposed between said exhaust conduit and said duct means adjacent said rotatable joint, said flexible piping being in axial alignment with said pins and positioned therebetween.

References Cited by the Examiner

UNITED STATES PATENTS

| | | | |
|---|---|---|---|
| 1,884,538 | 10/1932 | Blake | 237—12.3 X |
| 1,942,207 | 1/1934 | Ferwerda. | |
| 2,974,997 | 3/1961 | Parsley | 298—37 X |
| 3,116,803 | 1/1964 | Buchwald | 180—64 |
| 3,134,628 | 5/1964 | Lackey | 298—21 |

FOREIGN PATENTS 735,205  8/1955  Great Britain.

BENJAMIN HERSH, *Primary Examiner.*

R. J. JOHNSON, *Assistant Examiner.*